United States Patent
Ramesh et al.

(10) Patent No.: US 8,351,079 B2
(45) Date of Patent: *Jan. 8, 2013

(54) BANDING PROFILE ESTIMATION USING SPLINE INTERPOLATION

(75) Inventors: Palghat Ramesh, Pittsford, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 747 days.

This patent is subject to a terminal disclaimer.

(21) Appl. No.: 12/555,275

(22) Filed: Sep. 8, 2009

(65) Prior Publication Data

US 2011/0058226 A1    Mar. 10, 2011

(51) Int. Cl.
G06F 15/00    (2006.01)

(52) U.S. Cl. ......... 358/1.9; 358/504; 358/1.1; 358/1.14; 358/3.26; 358/3.27; 347/247; 347/255; 399/9; 399/167; 399/159; 399/38

(58) Field of Classification Search .................. None
See application file for complete search history.

(56) References Cited

U.S. PATENT DOCUMENTS

| | | | |
|---|---|---|---|
| 4,400,740 A | 8/1983 | Traino et al. |
| 5,165,074 A | 11/1992 | Melino |
| 5,251,058 A | 10/1993 | MacArther |
| 5,519,514 A | 5/1996 | TeWinkle |
| 5,550,653 A | 8/1996 | TeWinkle |
| 5,659,414 A | 8/1997 | Appel et al. |
| 5,680,541 A | 10/1997 | Kurosu et al. |
| 5,818,507 A | 10/1998 | Genovese |
| 5,835,121 A | 11/1998 | Genovese et al. |
| 5,963,244 A | 10/1999 | Metha et al. |
| 6,342,963 B1 | 1/2002 | Yoshino |
| 6,359,641 B1 | 3/2002 | Nacman et al. |
| 6,462,821 B1 | 10/2002 | Borton et al. |
| 6,567,170 B2 | 5/2003 | Tandon et al. |
| 6,621,576 B2 | 9/2003 | Tandon et al. |
| 6,694,109 B1 | 2/2004 | Donaldson et al. |
| 6,760,056 B2 | 7/2004 | Klassen et al. |
| 6,975,949 B2 | 12/2005 | Mestha et al. |
| 7,024,152 B2 | 4/2006 | Lofthus et al. |
| 7,038,816 B2 | 5/2006 | Klassen et al. |
| 7,054,568 B2 | 5/2006 | Mizes et al. |
| 7,058,325 B2 | 6/2006 | Hamby et al. |
| 7,136,616 B2 | 11/2006 | Mandel et al. |

(Continued)

OTHER PUBLICATIONS

U.S. Appl. No. 12/555,287, filed Sep. 8, 2009, Palghat Ramesh.

(Continued)

*Primary Examiner* — Benny Q Tieu
*Assistant Examiner* — Paul F Payer
(74) *Attorney, Agent, or Firm* — Pillsbury Winthrop Shaw Pittman, LLP

(57) ABSTRACT

A method, system, and computer program product for estimating a banding profile in an image printing system is disclosed. The method includes obtaining image data across multiple measurement intervals by a sensor; combining the image data with timing information into a coherent signal by a processor; determining aperiodic components of the coherent signal by the processor; determining the periodic component of the coherent signal using spline interpolation, wherein the periodic component represents a banding profile, by the processor; and printing an output print with a correction applied based on the banding profile.

21 Claims, 5 Drawing Sheets

U.S. PATENT DOCUMENTS

| | | |
|---|---|---|
| 7,177,585 B2 | 2/2007 | Matsuzaka et al. |
| 7,492,381 B2 | 2/2009 | Mizes et al. |
| 2003/0063183 A1 | 4/2003 | AuYeung et al. |
| 2006/0077488 A1 | 4/2006 | Zhang et al. |
| 2006/0077489 A1 | 4/2006 | Zhang et al. |
| 2007/0052991 A1 | 3/2007 | Goodman et al. |
| 2007/0139733 A1 | 6/2007 | Mizes et al. |
| 2007/0236747 A1 | 10/2007 | Paul |
| 2009/0002724 A1 | 1/2009 | Paul et al. |

OTHER PUBLICATIONS

U.S. Appl. No. 12/555,308, filed Sep. 8, 2009, Palghat Ramesh.

U.S. Appl. No. 12/190,335, filed Aug. 12, 2008, Moritz Patrick Wagner.

U.S. Appl. No. 12/112,618, filed Apr. 30, 2008, R. Enrique Viturro.

Reinsch, Smoothing by Spline Functions, Numeriche Mathematik 10, 1967, pp. 177-183.

BANDING PROFILE ESTIMATION USING SPLINE INTERPOLATION

CROSS REFERENCES

U.S. patent application Ser. No. 12/555,308 filed on Sep. 8, 2009, entitled "LEAST SQUARES BASED COHERENT MULTIPAGE ANALYSIS OF PRINTER BANDING FOR DIAGNOSTICS AND COMPENSATION," by Ramesh et al.;

U.S. patent application Ser. No. 12/555,287 filed on Sep. 8, 2009, entitled "LEAST SQUARES BASED EXPOSURE MODULATION FOR BANDING COMPENSATION," by Ramesh et al.;

U.S. Patent Application Pub. No. 2009/0002724, entitled "BANDING PROFILES ESTIMATOR USING MULTIPLE SAMPLING INTERVALS," by Paul et al.

FIELD

The present disclosure relates to a method, system and computer program product for banding profile estimation for an image printing system.

BACKGROUND

An electrophotographic, or xerographic, image printing system employs an image bearing surface, such as a photoreceptor drum or belt, which is charged to a substantially uniform potential so as to sensitize the surface thereof. The charged portion of the image bearing surface is exposed to a light image of an original document being reproduced. Exposure of the charged image bearing surface selectively discharging the charge thereon in the irradiated areas to record an electrostatic latent image on the image bearing surface corresponding to the image contained within the original document. The location of the electrical charge forming the latent image is usually optically controlled. More specifically, in a digital xerographic system, the formation of the latent image is controlled by a raster output scanning device, usually a laser or LED source.

After the electrostatic latent image is recorded on the image bearing surface, the latent image is developed by bringing a developer material into contact therewith. Generally, the electrostatic latent image is developed with dry developer material comprising carrier granules having toner particles adhering triboelectrically thereto. However, a liquid developer material may be used as well. The toner particles are attracted to the latent image, forming a visible powder image on the image bearing surface. After the electrostatic latent image is developed with the toner particles, the toner powder image is transferred to a media, such as sheets, paper or other substrate sheets, using pressure and heat to fuse the toner image to the media to form a print.

The image printing system generally has two important dimensions: a process (or a slow scan) direction and a cross-process (or a fast scan) direction. The direction in which an image bearing surface moves is referred to as the process (or the slow scan) direction, and the direction perpendicular to the process (or the slow scan) direction is referred to as the cross-process (or the fast scan) direction.

Electrophotographic image printing systems of this type may produce color prints using a plurality of stations. Each station has a charging device for charging the image bearing surface, an exposing device for selectively illuminating the charged portions of the image bearings surface to record an electrostatic latent image thereon, and a developer unit for developing the electrostatic latent image with toner particles. Each developer unit deposits different color toner particles on the respective electrostatic latent image. The images are developed, at least partially in superimposed registration with one another, to form a multi-color toner powder image. The resultant multi-color powder image is subsequently transferred to a media. The transferred multicolor image is then permanently fused to the media forming the color print.

Banding generally refers to periodic defects on an image caused by a one-dimensional density variation in the process (slow scan) direction. Bands can result due to many different types of variations within components and/or subsystems, such as run out (variations in roll or drum diameter) in a developer roll or photoreceptor drum, wobble in the polygon mirror of the laser raster optical scanner (ROS), and the like. Various sources of banding exist in an image printing system and the frequencies of these sources may be known based on the mechanical design of the image printing system.

For banding correction, accurate estimation of the banding profile is critical. The banding profile includes components at the banding source frequency as well as its harmonics. The banding profile may have a shape that requires many harmonics in order to be accurately described.

SUMMARY

In an embodiment, a method for estimating a banding profile in an image printing system is disclosed. The image printing system comprises at least one marking engine, the at least one marking engine comprising a charging device for charging the image bearing surface, an exposing device for irradiating and discharging the image bearing surface to form a latent discharged image, and a developer unit for developing toner onto the discharged portion of the image bearing surface. The method includes obtaining image data across multiple measurement intervals by a sensor; combining the image data with timing information into a coherent signal by a processor; determining aperiodic components of the coherent signal by the processor; determining the periodic component of the coherent signal using spline interpolation, wherein the periodic component represents a banding profile, by the processor; and printing an output print with a correction applied based on the banding profile.

In another embodiment, a system for estimating the optimal exposure modulation in an image printing system is disclosed. The system includes a marking engine; a sensor configured to obtain image data across multiple measurement intervals; an exposing device; and a processor. The processor is configured to combine the image data with timing information into a coherent signal, determining aperiodic components of the coherent signal, determining the periodic component of the coherent signal using spline interpolation, wherein the periodic component represent a banding profile.

In another embodiment, a computer program product, comprising a machine-readable medium having a machine-readable program embodied therein, said machine-readable program adapted to implement a method estimating the optimal exposure modulation in an image printing system is disclosed. The method includes obtaining image data across multiple measurement intervals; combining the image data with timing information into a coherent signal; determining aperiodic components of the coherent signal; and determining the periodic component of the coherent signal using spline interpolation, wherein the periodic component represent a banding profile.

Other aspects, features, and advantages will become apparent from the following detailed description, and the accompanying drawings.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure addresses the issue of banding profile estimation. The present disclosure proposes a method for estimating banding profiles comprising at least four steps. First, image data across multiple measurement intervals is obtained by a sensor. The measurement intervals may represent printed pages, interdocument zones, or customer image zones. The image data may represent print profiles. Second, the image data is combined with timing information into a coherent signal. Third, the aperiodic components of the coherent signal are determined. Fourth, the periodic component of the coherent signal is determined using spline interpolation, wherein the periodic component represents a banding profile. An output print may be printed with a correction applied to the banding profile.

Figure 1:
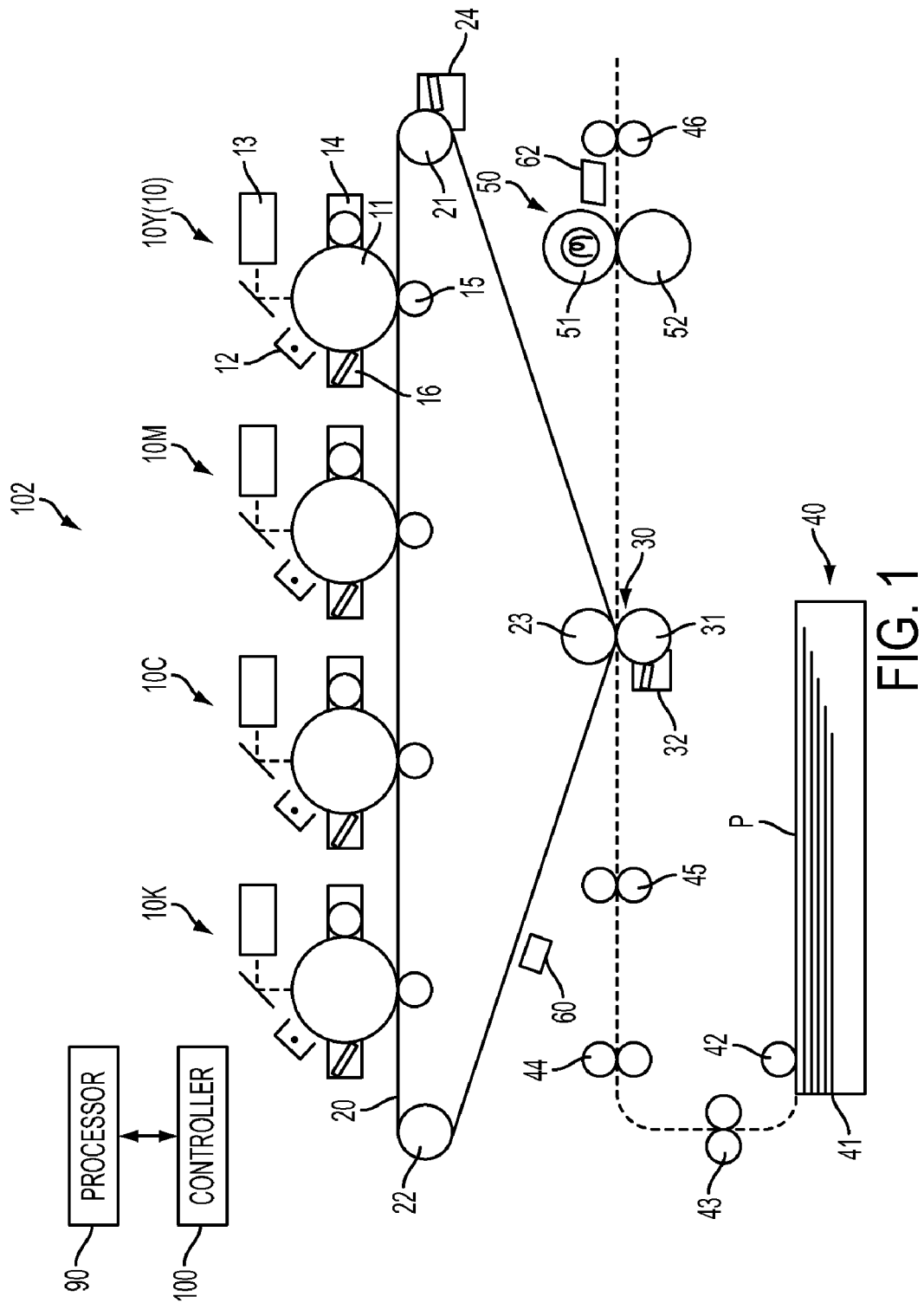
FIG. 1 illustrates an image printing system incorporating an embodiment.

FIG. 1 illustrates a schematic perspective view of an image printing system 102 in accordance with an embodiment. The image forming apparatus includes plural (in this exemplary embodiment, four) marking stations 10, an intermediate transfer belt 20, a secondary transfer device 30, a sheet carrying device 40, and a fixing device 50. The image forming apparatus further includes a controller 100 and a processor 90. A controller 100 may be provided to control the various elements and sequence of operations of the image printing system 102. In some implementations, the controller 100 and/or processor 90 may be dedicated hardware like ASICs or FPGAs, software (firmware), or a combination of dedicated hardware and software. Processor 90 may be one processor or may include one or more sub-processors. For the different applications of the embodiments disclosed herein, the programming and/or configuration may vary. Specifically, there is shown an "intermediate-belt-transfer" xerographic color image printing system, in which successive primary-color (e.g., C, M, Y, K) images are accumulated on image bearing surfaces 11. Each image bearing surface 11 in turn transfers the images to an intermediate transfer member 20. However, it should be appreciated that any image printing machine, such as monochrome machines using any technology, machines that print on photosensitive substrates, xerographic machines with multiple photoreceptors, "image-on-image" xerographic color image printing systems (e.g., U.S. Pat. No. 7,177,585, herein incorporated by reference in its entirety), Tightly Integrated Parallel Printing (TIPP) systems (e.g. U.S. Pat. Nos. 7,024,152 and 7,136,616, each of which herein incorporated by reference in its entirety), or ink-jet-based machines, may utilize the present disclosure as well.

The image printing system 102 includes a yellow station 10Y for forming a yellow image, a magenta station 10M for forming a magenta image, a cyan station 10C for forming a cyan image, and a black station 10K for forming a black image. The yellow station 10Y, the magenta station 10M, the cyan station 10C and the black station 10K form toner images of respective color components as images, by the electrophotography system.

The marking stations 10Y, 10M, 10C and 10K, which may serve as an image forming section, have the same configuration except colors of the used toner. Accordingly, for example, the yellow station 10Y will be described below. The yellow station 10Y includes an image bearing surface 11, a charging device 12, an exposure device 13, a developing device 14, a primary transfer device 15 and a drum cleaner 16. The charging device 12 charges the image bearing surface 11 to a predetermined potential. The exposure device 13 exposes the charged image bearing surface 11 to form an electrostatic latent image. The developing device 14 receives each color component toner (in the yellow station 10Y, yellow toner) and develops the electrostatic latent image formed on the image bearing surface 11 with the toner. The primary transfer device 15, for example, includes a roll member (primary transfer roll) which is in pressure-contact with the image bearing surface 11 via the intermediate transfer belt 20 with the intermediate transfer belt interposed between the primary transfer device 15 (roll member) and the image bearing surface 11. The primary transfer device 15 applies a predetermined transfer bias between the image bearing surface 11 and the primary transfer roll to primarily transfer the toner image formed on the image bearing surface 11 onto the intermediate transfer belt 20. The drum cleaner 16 removes remaining toner on the image bearing surface 11 after the primary transfer.

The intermediate transfer belt 20, which serves as a recording material, may be disposed rotatably and wound on a driving roll 21, a driven roll 22 and a backup roll 23. Among them, the driving roll 21 may be rotatable, and may stretch the intermediate transfer belt 20 and transmit a driving force to the intermediate transfer belt 20. The driven roll 22 may be rotatable, and may stretch the intermediate transfer belt 20 and may be rotated as the intermediate transfer belt 20 rotates. The backup roll 23 may be rotatable, and may stretch the intermediate transfer belt 20 and may serve as a constituent component of the secondary transfer device 30 as described below. A belt cleaner 24 for removing the remaining toner on the intermediate transfer belt 20 after secondary transfer may be provided so as to face a part of the intermediate transfer belt 20 wound on the driving roll 21.

The secondary transfer device 30 includes a secondary transfer roll 31 that is rotatable and that is in pressure-contact with a surface, on a side where the toner image is carried, of the intermediate transfer belt 20. The secondary transfer device 30 also includes a backup roll 23 disposed on the rear surface of the intermediate transfer belt 20 to form an opposite electrode for the secondary transfer roll 31. A predetermined secondary transfer bias is applied between the secondary transfer roll 31 and the backup roll 23 such that the toner image on the intermediate transfer belt 20 is secondarily transferred onto a sheet of paper P. For example, a roll cleaner 32 for removing the toner transferred from the intermediate transfer belt 20 to the secondary transfer roll 31 is mounted on the secondary transfer roll 31.

Image printing system 102 includes sensors 60 and 62 that are configured to provide image data (e.g., reflectance of the image in the process and/or cross-process direction) to the processor 90. The sensors 60 may be configured to sense images created on the intermediate transfer belt 20 and/or to scan test patterns. Sensor 62 may be configured to sense images created in output prints, including paper prints. It should be appreciated that any number of sensors may be provided, and may be placed anywhere in the image printing system as needed, not just in the locations illustrated.

It should be appreciated that sensors 60 and 62 may be Automatic Density Control (ADC) sensors. For an example of an ADC sensor, see, e.g., U.S. Pat. No. 5,680,541, which is incorporated herein by reference in its entirety. Sensors 60 and 62 also may be a Full Width Array (FWA) or Enhanced Toner Area Coverage (ETAC). See, e.g., U.S. Pat. Nos. 6,975, 949 and 6,462,821, each of which herein incorporated by reference in its entirety, for an example of a FWA sensor and an example of a ETAC sensor, respectively. Sensors 60 and 62 may include a spectrophotometer, color sensors, or color sensing systems. For example, see, e.g., U.S. Pat. Nos. 6,567, 170; 6,621,576; 5,519,514; and 5,550,653, each of which herein is incorporated by reference in its entirety. It should be appreciated that other linear array sensors may also be used, such as contact image sensors, reduction optics sensors, CMOS array sensors or CCD array sensors.

Processor 90 is configured to receive reflectance of the image, or image data, in the process and/or cross-process direction sensed by sensors 60 and/or 62. The processor 90 is configured to generate a reflectance profile data and send the data to the controller 100. Processor 90 may also be configured to augment image data with timing data from a signal that is synchronous with the banding source, as disclosed in U.S. Patent Application Pub. No. 2007/0236747, herein incorporated by reference in its entirety.

The sheet carrying device 40 includes a sheet accommodating section 41, a pickup roll 42, a separation roll 43, a preregistration roll 44, a registration roll 45 and an ejection roll 46. The sheet accommodating section 41 has an opening at its upper part, has a rectangular shape and accommodates the sheet P therein. The pickup roll 42 is provided above the sheet accommodating section 41 to continuously feed an uppermost sheet P of the stack of sheets P accommodated in the sheet accommodating section 41. The separation roll 43 separates and carries the sheets P, which are continuously fed by the pickup roll 42, one by one. The preregistration roll 44 carries the sheet P carried through the separation roll 43 downstream and forms a loop together with the registration roll 45. The registration roll 45 pauses the carrying of the sheet P and resumes the rotation at a predetermined timing so as to feed the sheet P while controlling the registration with respect to the secondary transfer device 30. The ejection roll 46 carries the sheet P, on which the toner image is transferred by passing through the secondary transfer device 30 and is fused by passing through the fixing device 50, toward a not-shown ejection section.

The fixing device 50 includes a heating roll 51 which has a heating source therein and which is rotatable. The fixing device 50 also includes a pressing roll 52 which is in contact with the heating roll 51 and rotates as the heating roll 51 rotates.

In one embodiment, processor 90 may be configured to estimate a banding profile using spline interpolation. To estimate a banding profile, processor 90 may be configured to obtain timing information and to combine timing information with image data. For example, while printing, the page timing information, such as the page synchronization signal, and the banding source timing information, such as the photoreceptor one around signal, may be obtained. The page synchronization signal may be a signal internally generated by controller 100 (shown in FIG. 1), for example, as is well known in the art. See U.S. Pat. No. 6,342,963, FIGS. 13A and 13B and corresponding discussion, herein incorporated by reference in its entirety, for examples of page synchronization signals. The page synchronization signal may indicate the leading beginning and end of a page of an output image. The photoreceptor once-around may indicate the beginning and end of one photoreceptor cycle, wherein a cycle begins and ends at the same point on the photoreceptor. The photoreceptor once-around signal may be generated by an optical sensor or encoder mounted on the rotating shaft of the photoreceptor drum, as is well known in the art. Processor 90 may be configured to combine image data sensed by sensors 60 and/or 62 with timing information, such as page synchronization and photoreceptor once-around signals, to obtain a banding profile. For more details about obtaining timing information and combining timing information with image data, see, e.g., U.S. Patent Application Pub. No. 2009/0002724 and 2007/0236747, each of which herein incorporated by reference in its entirety.

Figure 2:
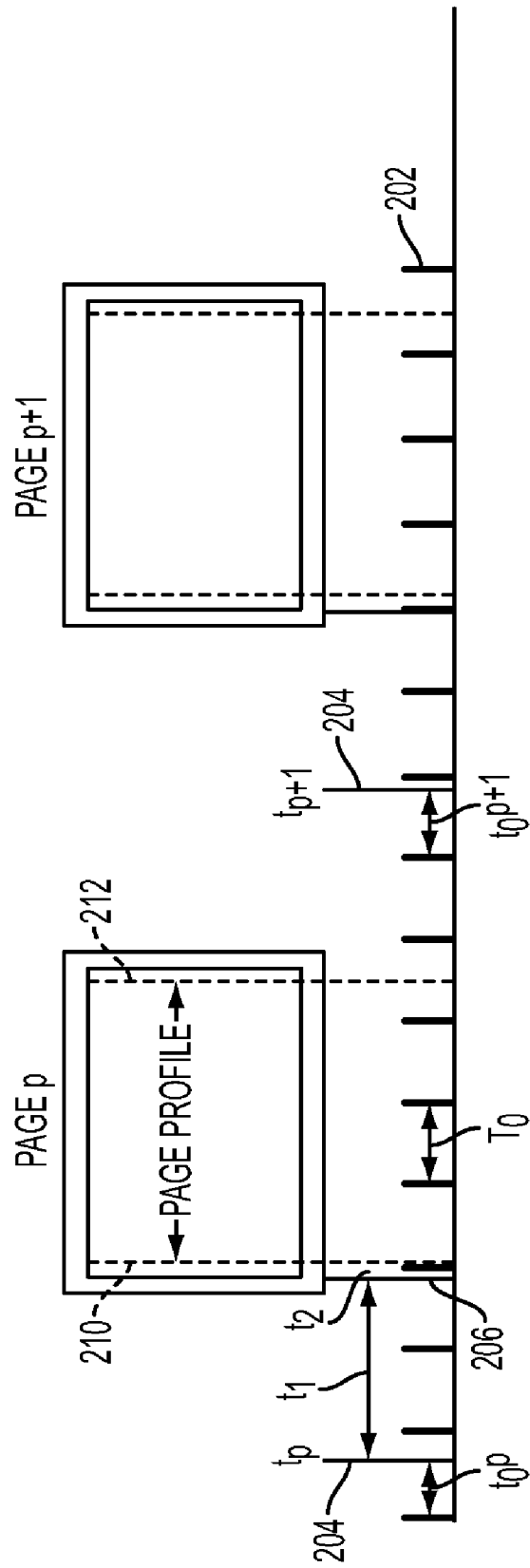
FIG. 2 illustrates a timing diagram.

FIG. 2 illustrates an example of a timing diagram used for banding profile estimation. $t_p(i_{ac})$ is the page synchronization time for page p for area coverage $i_{ac}$. $t_1$ is the time between the page synchronization and start of an image on a page. $t_2$ is the time between start of an image on a page and start of measured profile on the page. Both $t_1$ and $t_2$ are fixed for a particular target image. $t_0^p$ is the time between the page synchronization for page p and the most recent once around signal. $T_0$ is the once around period of the banding source. The banding source frequency is $f_0=1/T_0$. The lines 202 represent the photoreceptor once-around sensor signal. The lines 204 are the page synchronization signals. The line 206 indicates the beginning of an image on a page. Dotted line 210 indicates the beginning of a profile, while dotted line 212 indicates the end of the profile on the page.

For example, a point q in the page profile for page p, is located at a distance $x_q$ from the beginning of the profile. The time at q from the beginning of the page profile is $t_q=x_q/v$, where v is the process speed. The banding source once around time at location q on page p is given by $t_{pq}=\text{Mod}(t_0^p+t_1+t_2+t_q,T_0)$. Function $y(i_{ac},p,q)$ may represent a color parameter (L*, deltaE or scanner grayscale value or density or reflectance) at location q on page p as measured by an offline or inline spectrophotometer or scanner or density sensor for halftone density $i_{ac}$.

As disclosed in U.S. patent application Ser. No. 12/555,308 filed on Sep. 8, 2009, a model, where g1(p) refers to the page to page drift, g2(q) refers to the lead edge to trail edge variation, and g3(p,q) refers to the variation due to the banding source, may estimate color y (iac,p,q). g1 and g2 may be expressed as polynomials: and . n1 and n2 are the order of the polynomial for g1 and g2, respectively. As shown in U.S. patent application Ser. No. 12/555,308 filed on Sep. 8, 2009, the periodic component g3 may be expressed using sinusoidal basis functions. However, the proposed method described herein uses spline basis functions to express the periodic component g3. Spline basis functions may be more efficient in resolving complex periodic banding signatures compared to sinusoidal basis functions.

First, the aperiodic terms in the data ($g_1$ and $g_2$) may be removed to isolate the periodic component. The coefficients $a_i$ and $b_i$ may be solved for using Least Squares Estimation:

$$\text{Min}\left[\sum_{p=1}^{P}\sum_{q=1}^{Q}(y(p,q)-g_1(p)-g_2(q))^2\right]$$

Where P is the number of pages and Q is the number of samples per page. The residual profile, $y(p,q)-g_1(p)-g_2(q)$, is now predominantly composed of the periodic component. Second, aperiodic component may be given by $g_3(p,q)=S_k(t_{pq})$ for $t_s^k \leq t_{pq} \leq t_s^{k+1}$ where $S_k$ defines a spline between $t_s^k$ and $t_s^{k+1}$. A standard spline smoothing algorithm, such as a cubic spline smoothing algorithm, may be used to obtain $S_k$ that best fits $y_1(p,q)$, as is well known in the art. It should be appreciated $S_k$ may define many different types of splines, including but not limited to B-splines, cubic splines, linear splines, and quadratic splines. For information regarding spline smoothing algorithms, see Christian H. Reinsch, SMOOTHING BY SPLINE FUNCTIONS, Numeriche Mathematik, 10, 177-183 (1967), herein incorporated by reference in its entirety. It should be appreciated that other algorithms based on genetic algorithms and adaptive knot selection may also be used here.

Figure 3:
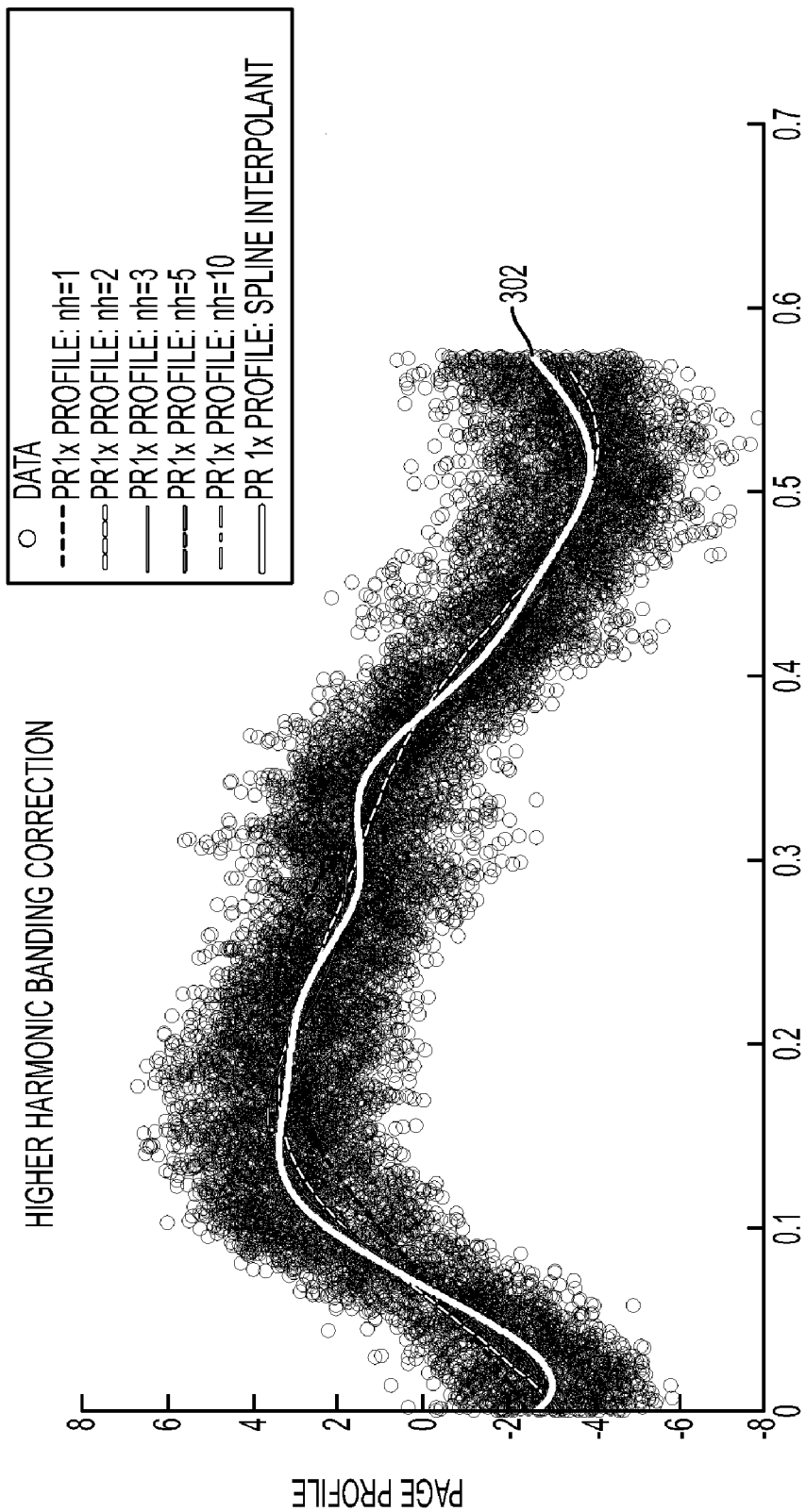
FIG. 3 illustrates banding profiles generated based on data collected from a Xerox DocuColor 250® for cyan photoreceptor once-around banding.

FIG. 3 illustrates banding profiles generated based on data collected from a Xerox DocuColor 250® for cyan photoreceptor once-around banding. Black dots represent the scanner data after subtracting the aperiodic components ($g_1$ and $g_2$) plotted versus the photoreceptor once around time. The photoreceptor once-around frequency $f_0$ is 1.742 Hz and the time period $T_0=0.574$ s. Line 302 representing "PR 1× PROFILE: SPLINE INTERPOLATION" is the estimated photoreceptor once-around banding profile, b(t), fitted using spline interpolation. Other curves are banding profiles estimated using sinusoidal basis functions. For the spline interpolation, 10 equally spaced knots were used (spaced 36 degrees apart).

Spline interpolation enables reliable banding correction profiles to be obtained without having to determine the number of harmonics included. An exposure modulation to be used for banding correction can be defined as $$d\exp(t) = -\frac{1}{s}b(t),$$

where s is the actuator slope (change in scanner reflectance with exposure power). Processor 90 (shown in FIG. 1) may be configured to generate a correction profile based on the banding profile. In one embodiment, the banding profile may be directly inputted to an arbitrary function generator, by processor 90 for example, to generate the correction profile. The correction profile may be applied by controller 100 to modulate the power or intensity of exposing devices 13. See also U.S. Pat. Nos. 7,492,381, 6,359,641, 5,818,507, 5,835,121, 5,659,414, 5,251,058, 5,165,074 and 4,400,740 and U.S. Patent Application Pub. No. 2003/0063183, each of which herein incorporated by reference in its entirety, for examples of methods and systems for modulating the power or intensity of exposing devices.

Figure 4:
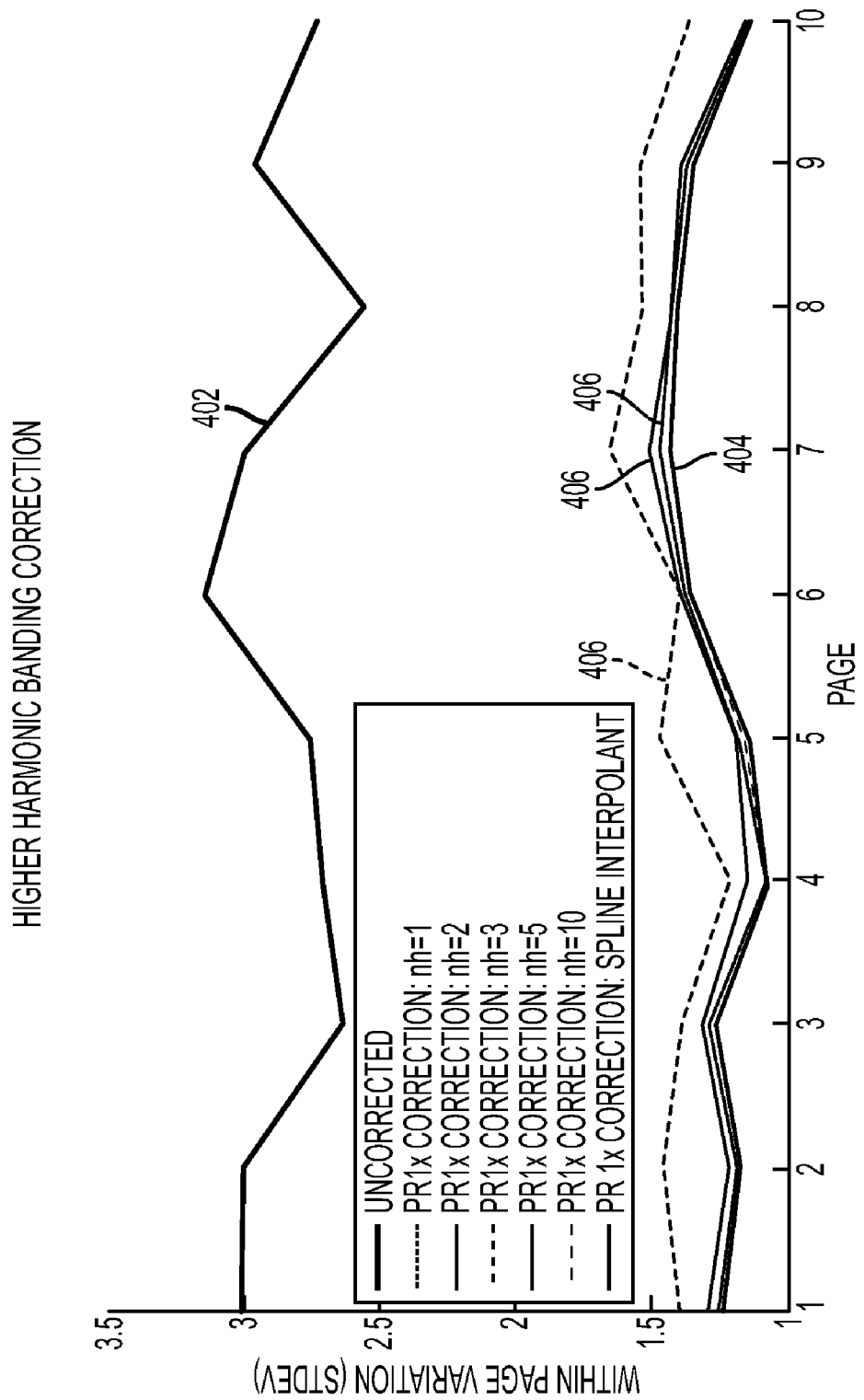
FIG. 4 illustrates the predicted improvement in within page uniformity by applying a correction profiles based on the banding profile shown in FIG. 3.

FIG. 4 illustrates the predicted improvement in within page uniformity by applying correction profiles based on the banding profile shown in FIG. 3. Line 402 represents the within page variation for a case where bands are uncorrected. Line 404 represents the within page variation for a case where the bands have been corrected based on a banding profile estimated using spline interpolation. Lines 406 represent the within page variation for cases where the bands have been corrected based on banding profiles estimated using sinusoidal basis functions of various harmonics. When using sinusoidal basis functions, the number of harmonics to include in the correction depends on the banding profile. As shown, for sinusoidal basis functions, using higher harmonics improves the performance of banding correction while spline interpolation line 404 lies in the range of the corrections using a high number of harmonics.

Figure 5:
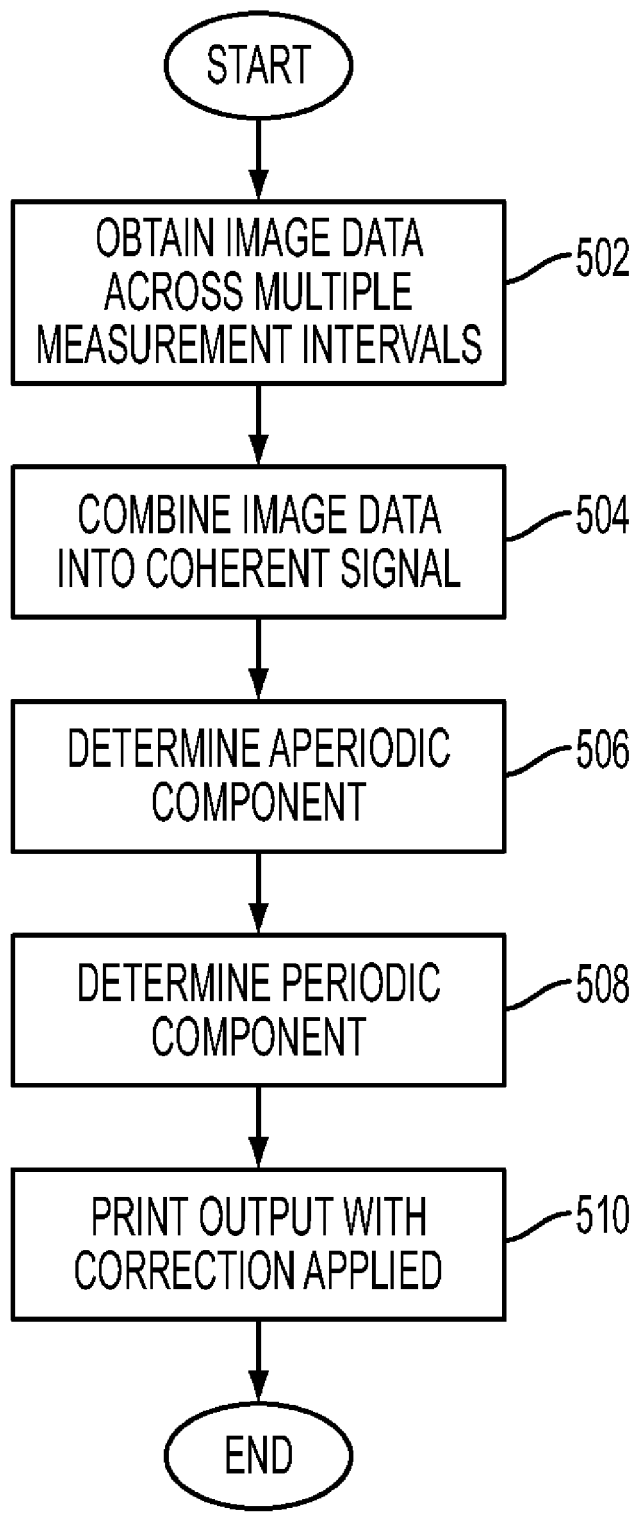
FIG. 5 illustrates a method for estimating a banding profile using spline interpolation.

FIG. 5 illustrates a method for estimating a banding profile using spline interpolation. In step 502, image data is obtained across multiple measurement intervals. The multiple measurement intervals may be pages, interdocument zones, or customer image zones. The image data may be in the form of print profiles. The image data may be obtained from sensors 60 and/or 62 for example. In step 504, the image data is combined with timing information into a coherent signal. The coherent signal may represent a defect profile across multiple pages. The timing information may be page synchronization signals and/or photoreceptor once-around signals. Processor 90 (shown in FIG. 1) may be configured to perform the step of combining the image data into the coherent signal. In step 506, aperiodic components of the coherent signal are determined. The aperiodic components may be determined using least squares estimation. In step 508, the periodic components are determined using spline interpolation, wherein the periodic component represents a banding profile. Step 510 is an optional step where an output print with a correction applied based on the banding profile is printed.

It should be appreciated that embodiments may be advantageously used in conjunction with controlling and/or modulating various actuators to apply a correction based on the banding profile in order to compensate for banding defects. Controller 100 (shown in FIG. 1) may compensate for bands by controlling the current/voltage driven by charging device 12 (shown in FIG. 1), as disclosed in U.S. application Ser. No. 12/190,335 filed on Aug. 12, 2008. Controller may also be configured to digitally modify the image data content, as disclosed in U.S. Pat. Nos. 7,038,816 and 6,760,056 and U.S. Patent Application Pub. Nos. 2006/0077488, 2006/0077489, and 2007/0139733, each of which herein incorporated by reference in its entirety.

These embodiments may also be advantageously used for tightly integrated parallel printing (TIPP) systems. Such systems are known where multiple printers are controlled to output a single print job, as disclosed in U.S. Pat. Nos. 7,136,616 and 7,024,152, each of which herein is incorporated by reference in its entirety. In TIPP systems, each printer may have defects in one or more components that cause banding. Each printer may have one or more exposing devices that may be modulated to compensate for banding. The banding profile for each printer may be estimated using cubic spline interpolation in accordance with the present disclosure.

Embodiments may be made in hardware, firmware, software, or various combinations thereof. Embodiments may also be implemented as instructions stored on a machine-readable medium, which may be read and executed using one or more processing devices. In one embodiment, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that such descriptions are merely for the sake of convenience and that such actions in fact result from computing devices, processing devices, processors, controllers, or other devices or machines executing the firmware, software, routines, or instructions.

The word "image printing system" as used herein encompasses any device, such as a copier, bookmaking machine, facsimile machine, or a multi-function machine. In addition, the word "image printing system" may include ink jet, laser or other pure printers, which performs a print outputting function for any purpose.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What we claim is:

1. A method for estimating a banding profile in an image printing system comprising at least one marking engine, the at least one marking engine comprising a charging device for charging the image bearing surface, an exposing device for irradiating and discharging the image bearing surface to form a latent image, and a developer unit for developing toner onto the image bearing surface, the method comprising:
    obtaining image data across multiple measurement intervals by a sensor;
    combining the image data with timing information into a coherent signal by a processor;
    determining aperiodic components of the coherent signal by the processor; and
    determining the periodic component of the coherent signal using spline interpolation,
    wherein the periodic component represents a banding profile, by the processor; and printing an output print with a correction applied based on the banding profile.

2. The method according to claim 1, wherein the correction is a correction profile based on the banding profile to control and/or modulate the output of one or more actuators.

3. The method according to claim 2, wherein said output of one or more actuators is the power or intensity of one or more exposing devices.

4. The method according to claim 1, wherein the aperiodic components of the banding profile represent page-to-page drift variation and lead edge to trail edge variation.

5. The method according to claim 1, wherein the timing information comprises one or more page synchronization signals and/or one or more component once around signals.

6. The method according to claim 5, wherein said component is a photoreceptor.

7. The method according to claim 1, wherein said multiple measurement intervals are at least one of printed pages, interdocuments zones, and customer image zones.

8. A system for estimating the optimal exposure modulation in an image printing system, comprising:
    a marking engine;
    a sensor configured to obtain image data across multiple measurement intervals;
    an exposing device; and
    a processor configured to:
        combine the image data with timing information into a coherent signal,
        determine aperiodic components of the coherent signal, and
        determine the periodic component of the coherent signal using spline interpolation,
        wherein the periodic component represents a banding profile.

9. The system according to claim 8, wherein the processor is further configured to generate a correction profile to control or modulate the output of one or more actuators.

10. The system according to claim 9, wherein said output of one or more actuators is the power or intensity of one or more exposing devices.

11. The system according to claim 8, wherein the aperiodic components of the banding profile represent page-to-page drift variation and lead edge to trail edge variation.

12. The system according to claim 8, wherein the timing information comprises one or more page synchronization signals and/or one or more component once around signals.

13. The system according to claim 12, wherein said component is a photoreceptor.

14. The system according to claim 8, wherein said multiple measurement intervals are at least one of printed pages, interdocuments zones, and customer image zones.

15. A computer program product, comprising a non-transitory machine-readable medium having a machine-readable program embodied therein, said machine-readable program, when executed by a processor, is adapted to implement a method estimating the optimal exposure modulation in an image printing system, said method comprising:
    obtaining image data across multiple measurement intervals;
    combining the image data with timing information into a coherent signal by the processor;
    determining aperiodic components of the coherent signal by the processor; and
    determining the periodic component of the coherent signal by the processor using spline interpolation,
    wherein the periodic component represent a banding profile.

16. The computer program product according to claim 15, further comprising generating a correction profile based on the banding profile to control or modulate the output of one or more actuators.

17. The computer program product according to claim 16, wherein said output of one or more actuators is the power or intensity of one or more exposing devices.

18. The computer program product according to claim 15, wherein the aperiodic components of the banding profile represent page-to-page drift variation and lead edge to trail edge variation.

19. The computer program product according to claim 15, wherein the timing information comprises one or more page synchronization signals and/or one or more component once around signals.

20. The computer program according to claim 19, wherein said component is a photoreceptor.

21. The computer program according to claim 15, wherein said multiple measurement intervals are printed pages, interdocuments zones, and/or customer image zones.

* * * * *